United States Patent Office 3,838,043
Patented Sept. 24, 1974

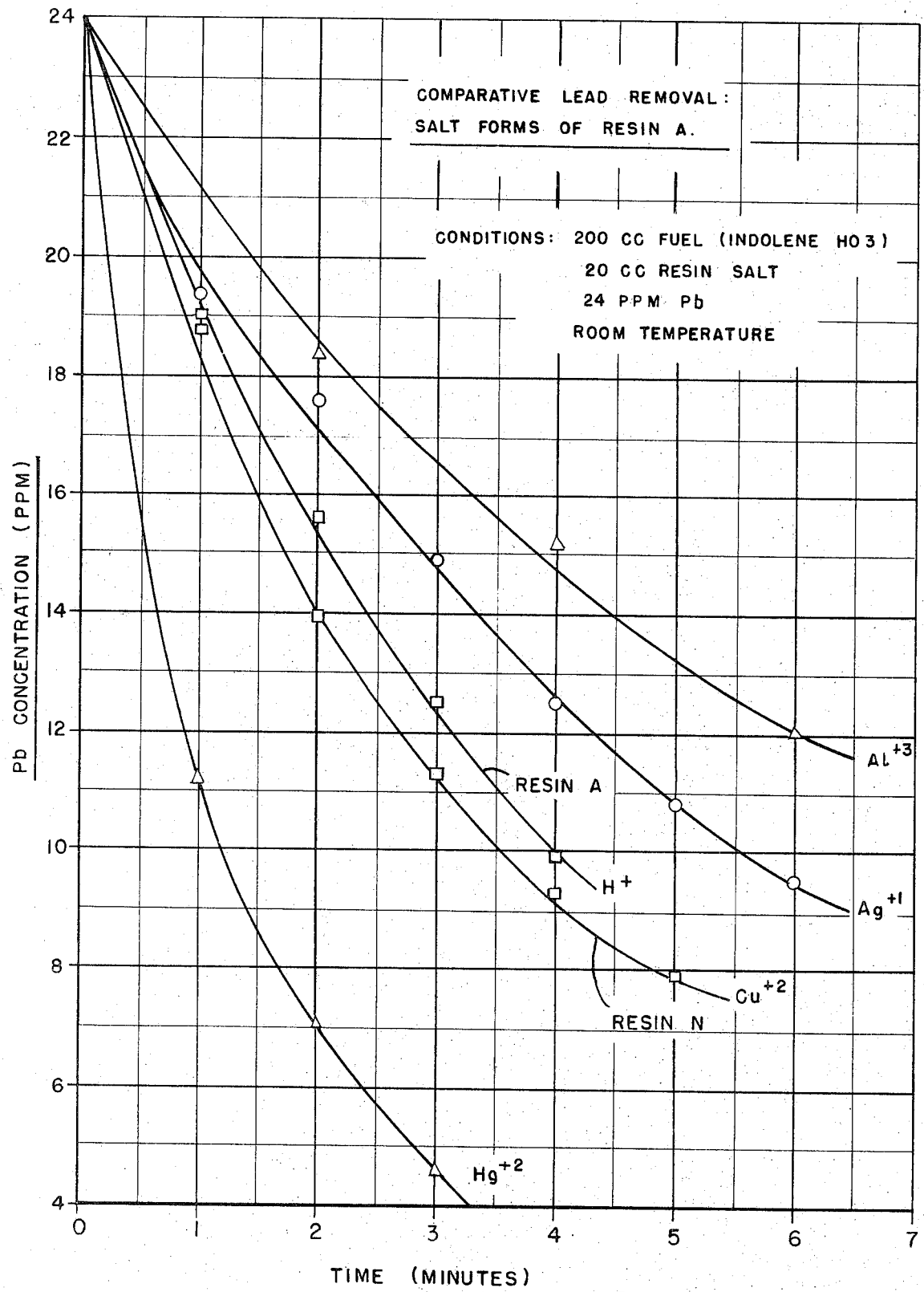
FIG. I

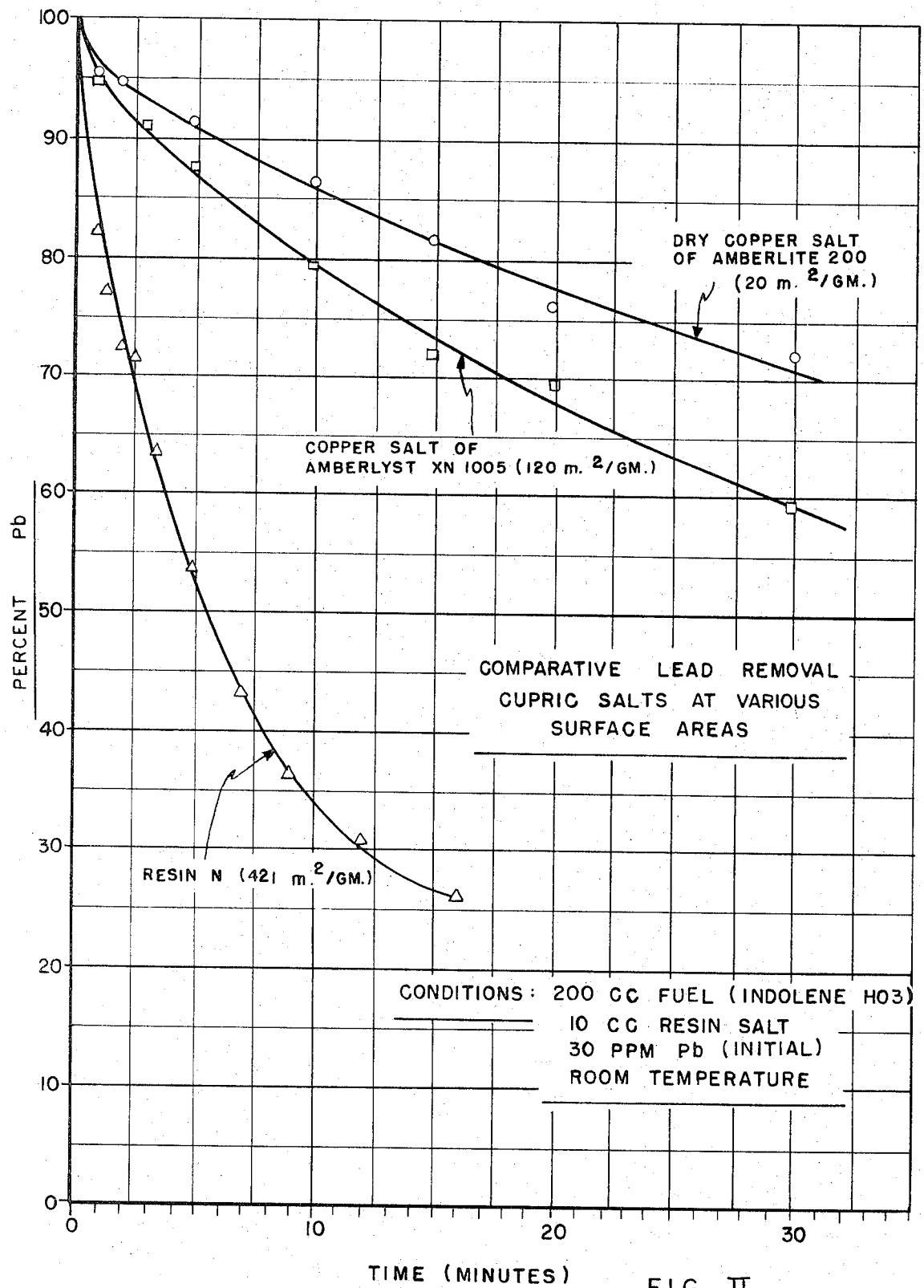
FIG. II

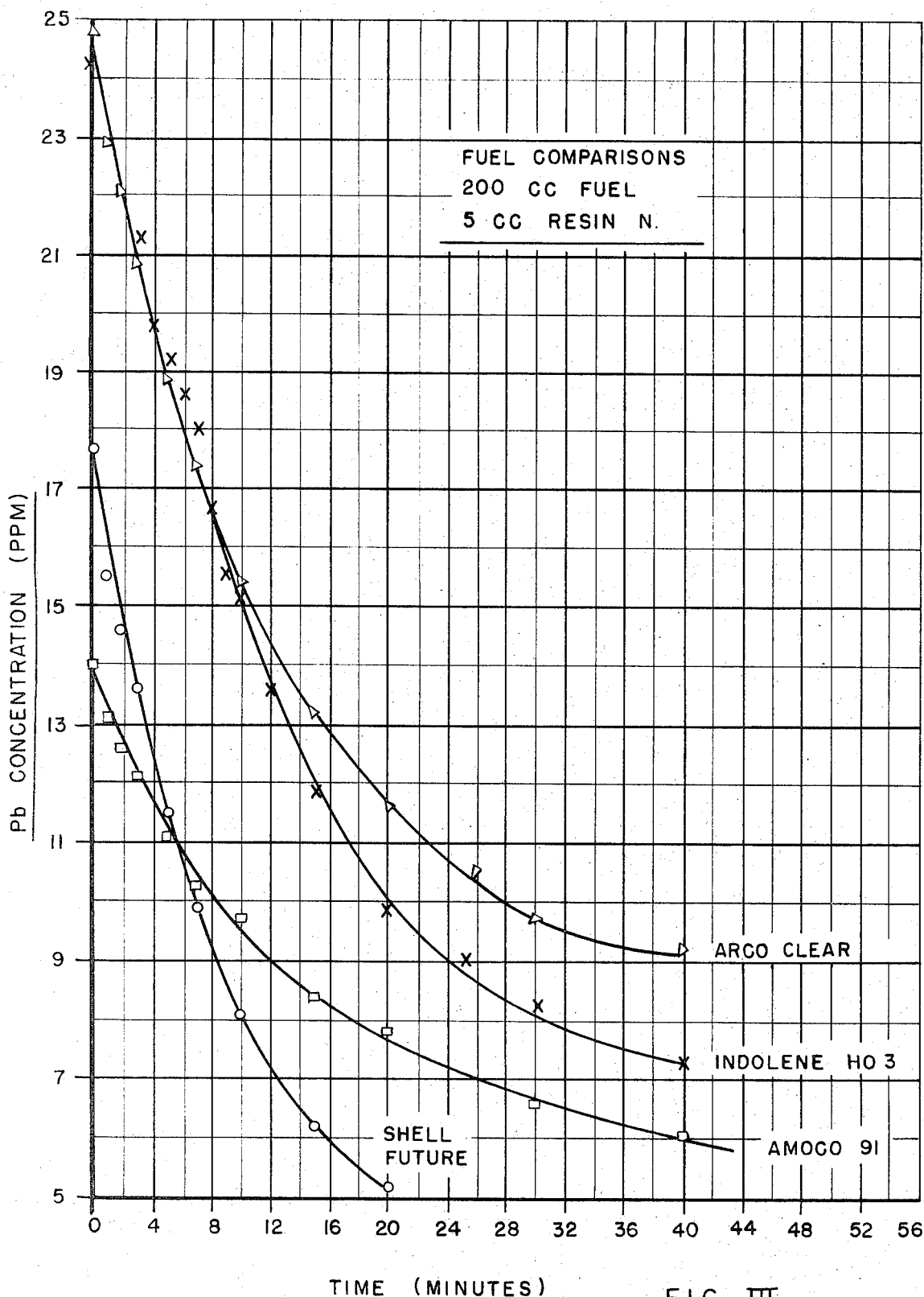
FIG. III

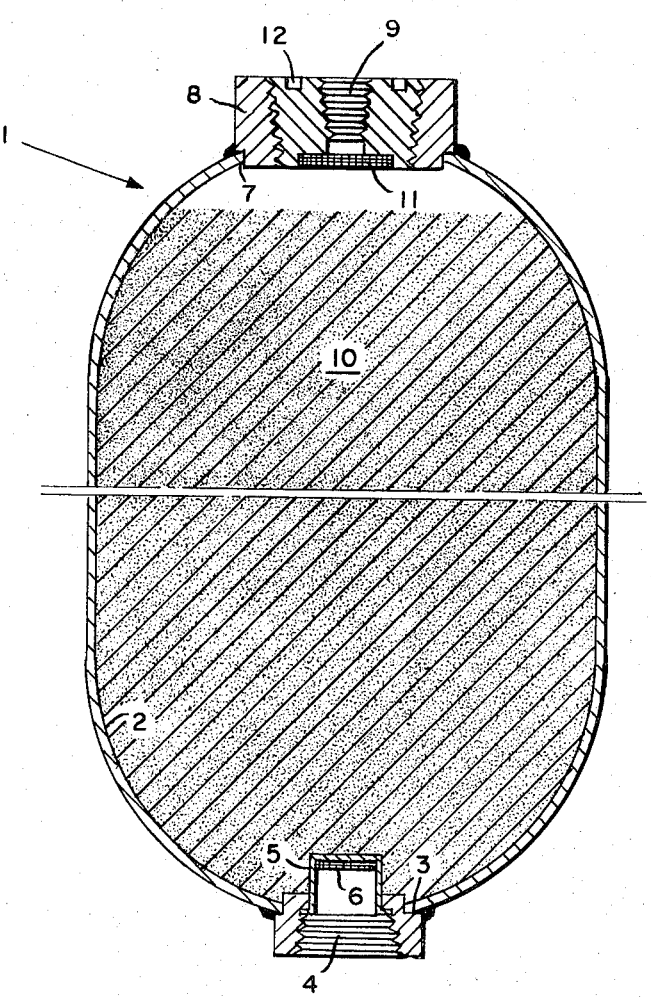
FIG. IV.

3,838,043
REMOVAL OF RESIDUAL ORGANOLEADS FROM ORGANIC LIQUIDS
Evan H. Crook, Cherry Hill, N.J., and Paul A. Kittle, Gardenville, Pa., assignors to Rohm and Haas Company, Philadelphia, Pa.
Filed Sept. 5, 1972, Ser. No. 286,484
Int. Cl. C10g 17/00
U.S. Cl. 208—251 R
24 Claims

ABSTRACT OF THE DISCLOSURE

This invention relates to a system for abatement of air pollution as caused by lead compounds in the fuels of internal combustion engines. In another aspect, it relates to selectively removing organoalkyl lead compounds residually present in fuels prior to their carburetion by I.C. engines so as to minimize interference with catalytic muffler performance.

BACKGROUND

Pressure for environmental improvement by ecologists and regulatory agencies has spotlighted, inter alia, the major health hazard caused by the toxic lead compounds emitted from the exhausts of today's combustion engines.

Moreover, though catalytic mufflers are a technical and commercial reality, one of the principal impediments to their wholesale acceptance is the degeneration in catalytic performance caused by lead compounds in exhaust gases, lead compounds (commonly as tetraalkyl lead in gasoline) poison the catalyst so that it will no longer oxidize aromatic and ethylenic hydrocarbons escaping in the exhaust stream. The Federal government is in the process of requiring petroleum refiners to produce gasolines lacking more than 0.05 g. Pb/gallon to minimize the lead toxicity problems to the environment; however, even these low levels of lead are known sufficient to poison the muffler catalyst. Therefore, they should be removed from the exhaust stream or eventually the catalyst will become inoperable.

Ultimately, the marketing of only lead-free fuels will minimize the problems of lead toxicity. Even at that time, however, useable fuels will contain residual amounts of lead arising from storage or transport of fuels in lead contaminated tanks or pipelines.

The removal of residual lead from such contaminated fuel to minimize catalyst poisoning and emission to the atmosphere of toxic organic and lead containing compounds from the exhausts of internal combustion engines is a principal object of the invention.

It is another object of this invention to dramatically extend the useful life of catalytic mufflers used to reduce noxious chemicals in engine exhausts.

It is still another object to selectively remove dispersed lead compounds from engine fuels where their octane boosting effect can be sacrificed.

It is yet another object to provide for minimization of air pollution from noxious exhaust compounds, while permitting the continued use of IC fuels in lower octane requirement engines containing measurable quantities of lead compounds.

It is a further object to provide a resin adsorbent which as compared to operable activated carbon, will achieve minimal leakage of lead compounds to be adsorbed over a substantial volume of effluent being treated.

U.S. Pat. 3,400,142, issued Sept. 3, 1968 relates to a process for preparing equilibrated tetraalkyl lead mixtures by redistribution of alkyl radicals which comprises affecting such redistribution in the presence of a trialkyl lead salt of a cation exchange resin, represented by the formula RE—SO$_3$H, wherein RE represents the resin portion.

According to the present invention, selected ion exchange macroreticular resins containing a strong acid, such as sulfonic acid functionality, or salt of the acid, are able to reduce significantly the level of lead compounds commonly blended into premium grade automotive gasoline.

Broadly, the present invention provides a method of significantly reducing the level of the organo-lead compounds contained in liquid comprising: contacting the lead-containing liquid with a mass or bed of a particulate cross-linked strongly acidic functional macroreticular resin in either the acid or metal salt form, whereby significant amounts of said lead compounds are removed therefrom.

These resins are conveniently utilized as particles of ionic, sulfonic acid (or its metal salts), macroreticular, water-insoluble, cross-linked polymer prepared from polymerizable ethylenically unsaturated monomers comprising about 2 to 100 weight percent of at least one poly-(vinyl)benzene monomer selected from the group consisting of divinylbenzene, trivinylbenzene, and alkyl divinylbenzenes having from 1 to 3 alkyl groups of 1 to 2 carbon atoms substituted in the benzene nucleus, which polymer has a surface area of at least 10 to 1000 square meters per gram, having a porosity of at least 10%, preferably 25%, ranging up to 75%, and having pores of an average diameter of at least 20 A., ranging up to 20,000 A.

The sulfonate derivative is preferentially based on a copolymer of 100 to 10 weight percent DVB and 0 to 90 weight percent of ethylvinylbenzene and styrene. The resulting resins will have the following physical parameters; a specific surface area of 250 to 700 meters per gram, a bead porosity of 30 to 50% by volume and an average pore diameter ranging from 20 to 100, and preferably from 40 to 50 Angstrom U. The sulfonation of such nonionic polymers is carried out by methods well known in the chemical arts to produce a sulfonic acid ion exchange resin in the hydrogen form.

The ability to delead gasoline increases with increasing surface area of the macroreticular, strong acid ion exchange resin, or metal salts of said resin.

The data in the present specification clearly demonstrate the selectivity of high performance of the herein disclosed class of ion exchange resins in removing lead compounds from conventionally leaded gasoline, or for that matter, any other lead compounds from organic liquids.

This is confirmed by the observation that the theoretically interesting carboxylic resins, whether in gel or MR form, were shown not to be even potentially useful in this application.

The exemplary and preferred resins of the working examples are crosslinked polystyrene copolymers which are composed of styrene and ethylvinylbenzene. It is sulfonated as will be described below and then takes the form of +100 to −16 mesh beads, with bead porosity of 30 to 50 volume percent, surface area of 250 to 700 square meters per gram, and an average pore diameter of 20 to 100 Angstrom units.

Generally, the resins which are useful in the present invention are a strong acid derivative (acid or salt) of a copolymer composed of 100 to 10 weight percent of divinylbenzene, and from 0 to 90 weight percent of styrene and ethylvinylbenzene both percentages being by weight and having physical parameters as defined in the preceding paragraph.

This invention will be better appreciated when considered in connection with the following specification and the drawing in which:

FIG. I is a series of curves illustrating the comparative lead removal performance of several macroreticular resins;

FIG. II is a series of curves illustrating the comparative lead removal performances of certain resins having various surface areas.

FIG. III is a series of curves demonstrating the performance of a particular macroreticular resin with several internal combustion engine fuels.

FIG. IV is a vertical section of the several components of the filter canister as they are assembled and ready for installation in a fuel transport system.

Metal salts of sulfonic acid, macroreticular resins, react with organo-lead compounds at different rates. Many metal ions (as salts) are known to react but not all of them react at a practical rate.

Certain metal salts, ferric, aluminum (+3), cupric, mercuric, zinc, silver, and gold, are more reactive (greater than 10% removal in 30 minutes under the conditions of FIG. II) than others (Co+2, Ni+2, Na+1). The latter do not react at the above mentioned conditions but at least the cobalt and nickel salts will react at higher temperatures.

Suitable monoethylenically unsaturated monomers including monovinylidene monomers, include the following: styrene, alkyl substituted styrene, alkyl substituted aromatics having one to four alkyl groups of one or two carbons each. Suitable catalysts, usually in the range of 0.01% to 3% by weight with reference to the weight of the monomer or monomer mixture, may be used to provide free radical initiation in the polymerization reaction. Examples include benzoyl peroxide, lauroyl peroxide, t-butyl hydroperoxide, t-butyl perbenzoate cumene peroxide, and azo catalysts such as azodiisobutyronitrile, azodiisobutyramide, etc. Suitable phase-extending or phase separating solvents, include, for example, methyl isobutyl carbinol, methyl isobutyl ketone, n-butyl acetate, xylene, toluene, iso-octane, chlorobenzene, as well as others known to the art.

Suitable polyunsaturated cross-linking monomers include the following: Divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, trialyl citrate, triallyl phosphate, N,N'-methylenediacrylamide, N,N'-methylene dimethacrylamide, N,N'-ethylenediacrylamide, trivinylbenzene, trivinylnaphthalene, polyvinylanthracenes and the polyallyl and polyvinyl ethers of glycol, glycerol, pentaerythritol, resorcinol and the monothio or dithio derivatives of glycols.

The preferred proportion of the polyethylenically unsaturated cross-linking monomer is from 25 to 75% by weight of the total monomer mixture from which the resin is prepared. Suspension polymerization usually produces the resin in the form of granules or beads having an overall bead size in the range of about 0.1 to about 3 millimeters average diameter.

Although the present invention concerns itself mainly with a very high surface area e.g., 570 m.$^2$/g. sulfonic acid resin, which gives the highest degree of organolead removal of those macroreticular sulfonic acid resins which were tested, it is obvious that by improved technology higher capacity macroreticular sulfonic acid resins may be synthesized. This could be accomplished by use of higher surface area resin containing a higher concentration of sulfonic acid.

Phosphoric acid may be usefully employed to treat the copolymer to make the corresponding phosphoric acid, or derived metal salt.

This improvement of strong acid groups could give resins having advantages over the exemplary resins, i.e., the data of record is not deemed to be limitative of the scope of the present invention. Rather, it represents the current best mode available from the combined technologies of synthesis of high surface area polymers, and their subsequent sulfonation, and conversion to selected metal salts.

Eventually, the cation exchange resins of this invention will be completely exhausted to the point of lead breakthrough, by passage of gasoline containing organolead through them. First, after rehydration of the resins has been preferentially accomplished by the consecutive passage of benzene, methanol, and water through them, they may be optionally regenerated by passage of aqueous solutions of a mineral acid (e.g. $HNO_3$) therethrough. In choosing such acid regenerant, it is necessary that the resulting lead salt be soluble in aqueous systems.

Alternatively, an organic acid such as glacial acetic acid, dissolved in a lead-free hydrocarbon, conveniently isooctane, may be passed through the lead-loaded resin to regenerate the resin to the free sulfonic acid form. The major consideration in either aqueous or non-aqueous regenerations is that the lead metal ion should be removed from the resin as a soluble entity. In certain embodiments, reconversion to the disclosed metal salts is indicated.

EXAMPLE I

Process for the Manufacture of Resin A

To a 2-liter reaction flask are charged 500 g. of ethylene dichloride (EDC), 132.2 g. of Resin E (porosity =52.2% vol.; surface area=771 m.$^2$ g.$^{-1}$, pore diameter=51.6 A.) and 700 g. of concentrated sulfuric acid (99+%) in that order. Agitation is initiated in the reactor during the introduction of the copolymer. The fluid mixture is heated to 65° C., and this temperature is maintained for two hours to permit swelling of the copolymer matrix by the EDC. During the 2 hour hold period, surface sulfonation occurs and sulfuric acid begins to penetrate into the matrix of the copolymer.

The reaction temperature is raised to 85° C. at which point the EDC begins to boil out. The EDC is removed as rapidly as possible. As the slurry is depleted of EDC, it becomes very viscous. If the viscosity of the mixture becomes so great that agitation ceases, an additional 100 g. of concentrated surfuric acid is added. Once temperature in the system reaches 110° C., it is maintained at this level for two hours. The slurry is cooled to 90° C.

Then with maximum cooling to the reaction flask, water is added to the slurry at such a ratio that the temperature in the system does not exceed 120° C. As the exotherm decreases, the rate of cooling is decreased so that the temperature of the reactor can be maintained between 90–120° C. Once 1.8 bed-volumes of water have been introduced, the bulk liquid is siphoned off to the top of the bed. Then another 1.8 bed-volumes of water is introduced as rapidly as possible while maintaining the temperature between 90–120° C. The reaction mixture is then agitated for ½ hour and as much of the bulk liquid as is possible is removed via a tube filter.

This step of adding 1.8 bed-volumes of water, agitation of mix for ½ hour, and subsequent tube filtration is repeated a total of four times, or until such time that the acid content of the liquid phase is <0.5%. The product so formed has the following properties (skeletal density 1.438 g./cm.$^3$; apparent density=0.759 g./cm.$^3$; porosity=44%; cation exchange capacity=3.79 meq. g.; solids=46.1%).

EXAMPLE II

Procedure for Synthesis of Resin B

There is charged 31.5 g. of NaCl in 350 g. of tap water into a 3-liter flask. Then is dissolved 5.78 g. of Pharmage® (a pharmaceutical grade of gelatin supplied by Kind and Knox Gelatin, Camden, N.J.) in 350 g. of water at 50–60° C. Next, separately 52.5 g. of polyallyldimethylammonium chloride by Calgon Co., Pittsburgh is diluted in 350 g. of water. The Pharmagel and PADMAC solutions then then added to the flask with stirring. Commercial DVB (525 g., 55–60% DVB), 525 g. diisobutyl ketone, and 5.25 g. of benzoyl peroxide are charged into a beaker and mixed. The resultant solution is added to the system and the monomer system is maintained suspended via intermittent agitation.

With stirring, heat to 80° C. and hold overnight (16 hours) at 80° C. The mixture is heated to azeotropically distill off the DIBK until the distillate is solvent free. The reaction mixture is cooled, and is washed several times with water. The resin is dried overnight at 75° C. This gives copolymer Resin B.

Now, charge 2800 g. of 99+% sulfuric acid, 600 g. ethylene dichloride, and 400 g. of Resin B to a 5-liter flask with the stirrer off. The reaction mixture is permitted to set without agitation for 15 minutes to permit the resin to swell. The reaction mixture is stirred and heated to 65° C. This temperature is held for 1 hour and then raised to 110° C. in order to distill off the EDC, by holding the temperature for 3 hours at 110° C. Then cooling of the flask to 50° C. occurs, followed by quenching slowly with tap water (ca. 500 ml.). Wash the resin several times batchwise with water. Then backwash the resin with water until the effluent is neutral. Dry resin overnight at 75° C. Measured surface area of Resin B is 240 m.²/gm.

EXAMPLE III

Procedure for Synthesis of Resin C

Charge 19,500 lbs. of sulfuric acid (99+%) to a reaction kettle. Add 3,250 lbs. of copolymer of styrene and DVB (8%) to the kettle with the agitator on. Heat the batch to 80° C. rapidly. Allow temperature of the batch to reach 118–122° C. (not to exceed 122° C.) temperature range. Hold the temperature in the 118–122° C. range for 6 hours. Cool batch to 70° C. Then dilute with water holding batch temperature at 70° C. The liquid is siphoned off and diluted again with water. This process is repeated a total of five times. The resulting polymer is a gel resin having no internal surface area because of its lack of a macroreticular character.

EXAMPLE IV

Procedure for Synthesis of Resin N (Copper Salt)

50 ml. (41 g.) of the Resin A was slurried in City water and charged to a 1" O.D. glass column fitted with a fritted glass plug. The resin was then backwashed with tap water to classify the bed. 0.5N CuSO₄ solution was passed through the resin bed at 6.6 ml./min. until copper could be detected in the effluent. The resin was then washed with DI water until the effluent was copper free. The resin was filtered through a Buchner funnel. The filtered resin is then dried at 110–120° C. to 95+% solids.

EXAMPLE V

Samples (25 ml. each) of −30 +40 mesh sulfonic acid resins, having surface areas of 240, 50 and <1 m.²/g., along with a 25 ml. sample of activated carbon having a surface area of ca. 1000 m.²/g. were charged to buret columns, and solvent conditioned to remove impurities. ARCO Supreme gasoline (containing 2.65 g. Pb/gallon) was passed through the resin at a flowrate of 8 bed volumes/hr. The following results were obtained:

Resin B (240 m.²/g.)

| BV: | Percent TAL leakage |
|---|---|
| 0–30 | <1 |
| 40 | 14 |
| 50 | 25 |
| 60 | 12 |
| 70 | 15 |
| 80 | 47 |

Resin M (50 m.²/g.)

| BV: | Percent TAL leakage |
|---|---|
| 0–10 | <1 |
| 11–20 | 25 |
| 24–30 | 59 |
| 31–40 | 79 |

Resin C (<1 m.²/g.)

| BV: | Percent TAL leakage |
|---|---|
| 1–5 | 100 |

Pittsburgh Carbon BPL 12–30 (Circa 1000 m.²/g.)

| BV: | Percent TAL leakage |
|---|---|
| 1–5 | 22 |
| ¹5 | 87 |

¹ Instantaneous.

The sulfonic resin B, containing the greatest surface area, has the greatest capacity for TAL, while the sulfonic resin C having <1 m.²/g. surface area has no capacity for TAL pickup. Thus, sulfonic acid functionality is a necessary, but insufficient condition for the removal of TAL from gasoline. Further, enough of the sulfonic acid groups must be available for surface reactions with the TAL before substantial amounts of TAL are removed.

The activated carbon sorbs out a limited amount of TAL because of the very high surface area. But since there is no functionality present to react with the TAL substantial leakage of lead occurs within the first 5 BV of effluent.

EXAMPLE VI

A. Column Evaluation of Lead Removal with Resin A

Twenty-five (25) ml. of −30 +40 mesh resin (surface area 570 m.²/g.) were charged to a buret column and conditioned with successive elutions of water, methanol, benzene and isooctane (TAL free). ARCO Supreme gasoline (containing 2.65 g. (Pb)/gallon of gasoline) was passed through the resin bed at a flow rate of 4 BV/hr. for 30 BV's.

When no detectable leakage occurred the flow rate was increased to 8 BV/hr. and was maintained for the remainder of the run. The results obtained are presented in the following table:

TABLE I

| Bed Vol.: | Percent original TAL left |
|---|---|
| 0–119 | >1 |
| 120 | 6 |
| 125 | 11 |
| 130 | 16 |
| 135 | 21 |
| 145 | 25.5 |
| 150 | 36 |
| 155 | 44 |
| 160 | 46 |
| 165 | 58 |
| 170 | 60.5 |
| 175 | 63 |

A similar run with carbon resulted in a cumulative leakage of 22% in only 5 bed volumes. This should be compared to the above data wherein no leakage was detected until the 120th bed volume.

B. Effect of Surface Area on TAL Removal

A more rapid procedure for evaluating the candidate resins as regards the effect of surface area on TAL removal has been developed. Five mls. of dry resin was placed in a sintered glass tube. ARCO Supreme gasoline was passed through the resin at a flow rate of 15 BV/hr. One liter of effluent was collected and passed through the resin again. The effluents were analyzed for Pb content after each pass. The resultant data are presented in the Table II.

TABLE II

| | Surface area (m.²/g.) | 1st cycle, remaining percent of original Pb | 2d cycle, percent original lead |
|---|---|---|---|
| Candidate resin: | | | |
| A | 570 | 39 | 7.5 |
| B | 240 | 54 | 30 |
| M | >47 | 79 | 67.5 |
| Carbon (filtrasorb 300) | ca. 1,000 | 83 | 87 |

Thus, the sulfonic Resin A, having the highest surface area, gave the greatest removal of TAL under the operating conditions described previously.

EXAMPLE VII

Equilibrium Determination

In order to screen a series of adsorbents and ion exchange resins for their capability to remove TAL from liquid hydrocarbon fuels, equilibrium experiments were set up. Ten ml. of dry resin was contacted with 20 ml. of the ARCO Supreme gasoline in a capped 4 oz. jar on a mechanical shaker for a fixed time interval. The supernatant gasoline was then decanted and analyzed for lead content. The obtained results are presented in Table III.

TABLE III

| Sample | General nature | Type | Equilibrium time (hrs.) | Percent of original TAL |
|---|---|---|---|---|
| Resin: | | | | |
| A | Sulfonic MR | Cation exchange resin | 2.5 | <1 |
| B | do | Resin exchange | 2.5 | <1 |
| C | Sulfonic gel | do | 24 | 95 |
| D | DVB/styrene | Sorbent | 16 | 72 |
| E | DVB | do | 6 | 80 |
| F | TMPTMA | do | 16 | 51.5 |
| G | TMPTMA/MMA | do | 16 | 62 |
| H | Sulfoxide | do | 16 | 65.5 |
| I | Amide | do | 16 | 68.0 |
| J | Carboxylic MR | Resin exchange | 6 | 84 |
| K | Carboxylic gel | do | 6 | 83 |
| L | do | do | 24 | 91 |
| Filtrasorb 300 | Activated carbon | Sorbent | 2.5 | <1 |
| Resin N | Sulfonate MR | Resin exchange | 2 | <1 |

The data demonstrate that only the macroreticular sulfonic acid based ion exchange resins and activated carbon (Filtrasorb 300) are capable of removing all the TAL from the ARCO Supreme gasoline.

The chemical and physical nature of the resins evaluated and tabulated in Table III are as follows:

TABLE IV

Resin A: A macroreticular strongly acidic cation exchange resin prepared by the sulfonation of a Resin E which is a copolymer 85% divinylbenzene with 15% ethylvinylbenzene (surface area=570 m.²/g.).

Resin B: A macroreticular strongly acidic cation exchange resin prepared by the sulfonation of a macroreticular copolymer of commercial DVB (55% DVB–45% EVB)—(sulfare area=240 m.²/g.).

Resin C: A gel strongly acidic cation exchange resin prepared by the sulfonation of a gel copolymer of styrene/DVB (92/8) (surface area=<1 m.²/g.).

Resin D: A macroreticular copolymer of 50% divinylbenzene plus 50% styrene and EVB (U.S. Pat. 3,531,-463) (surface area=300 m.²/g.).

Resin E: A macroreticular copolymer of 85% DVB, 15% ethyl vinylbenzene (U.S. Pat. 3,531,463) (surface area=780 m.²/g.).

Resin F: A polymer of trimethylolpropane trimethacrylate (surface area=450 m.²/g.).

Resin G: A macroreticular copolymer of 50% trimethylolpropane trimethacrylate and 50% methylmethacrylate (surface area=140 m.²/g.).

Resin H: Phenyl sulfoxide derivative of a MR copolymer of 50% divinylbenzene (DVB) plus 50% styreneethylvinylbenzene (U.S. Pat. 3,531,463) (surface area=200 m.²/g.).

Resin I: A copolymer (MR) of 50% diacetone acrylamide (DAA) and 50% trimethyloltrimethacrylate (surface area =150 m.²/g.).

Resin J: A macroreticular weakly acidic acrylate-based ion exchange resin, prepared by the hydrolysis ($H_2SO_4$) of a DVB cross-linked methyl acrylate resin porosity=0.10–0.15 ml./ml. of resin).

Resin K: A macroreticular weakly acidic acrylate based ion exchange resin prepared by the hydrolysis ($H_2SO_4$) of a DVB cross-linked methyl acrylate resin (porosity=0.05 ml./ml. of resin).

Resin L: A carboxylic acid type cation exchange resin made by hydrolyzing a terpolymer of methyl acrylate, acrylonitrile and DVB (surface area=<1 m.²/g.).

Resin M: A macroreticular strongly acidic cation exchange resin prepared by the sulfonation of a MR copolymer containing divinylbenzene, styrene and EVB (surface area=50 m.²/g.).

Resin N: A macroreticular cation exchange resin prepared by the conversion of Resin A to metal salt form (surface area=421 m.²/g.).

EXAMPLE VIII

Procedure for Determining Comparative Lead Removal

Twenty ml. of each of several resin salts are agitated with 200 ml. of Indolene HO[3] (a test gasoline) which has been spiked with tetraethyl lead, initially at 24 ppm. The residual TEL concentration is measured as a function of time of contact via atomic absorption. The resulting data were plotted and are presented as the curves of Figure I.

It was concluded from the data presented in Figure I that the following relative performances in lead removal were obtained; the rates of the performances are presented qualitatively as decreasing the rate of lead removal:

$$Hg+2 > Cu+2 > H+1 > Ag+1 > Al+3$$

Additionally, though they are not included in the Figure to avoid cluttering, Zn+2 is essentially equivalent to Cu+2 in lead removal performance, while Fe+3 is essentially equivalent to Al+3.

EXAMPLE IX

Procedure for Lead Removal at Various Resin Surface Areas

The procedure of Example VIII was followed except that 10 ml. (instead of 20) of the cupric salt of three resins was employed.

Amberlite 200 is a sulfonic acid derivative of macroreticular resin of relatively low surface area, which is supplied by Rohm and Haas Company, Pa. Amber–XN–1005 is a sulfonic acid derivative of a macroreticular resin of intermediate surface area, supplied by Rohm and Haas Company, Pa. Resin N (completely described in the specification) is a relatively high surface area cupric salt of a sulfonic acid macroreticular resin.

The resulting data were plotted and are presented as curves in Figure II. These data demonstrate that the high surface area of Resin N is highly advantageous with respect to removal of tetraalkyl lead as compared to the other lower surface area resins, this despite their common functionality.

EXAMPLE X

Procedure for Determining Lead Removal with Different Fuels

The procedure of Example VIII was utilized except that five ml. of MR resin were employed with each leaded fuel evaluated. Each gasoline sample was spiked to an initial, but varying lead concentration, which is indicated in the zero time concentration ordinate of Figure III.

The resulting data are plotted and presented as curves in the above mentioned Figure. They demonstrate that substantial tetra alkyllead removal is achieved with each of three commercial and one test gasoline.

EXAMPLE XI

Runs were made under three sets of conditions to establish whether Resin N had a minimal adverse effect upon the numerous detergents which are incorporated into standard gasolines to improve and extend carburetor cleanliness. The results are shown below in Table V.

TABLE V.—ENGINE TEST STUDIES ON MOBIL MS-08 TEST GASOLINE

| Duration of test (hours) | Mg. of carburetor deposits | | |
|---|---|---|---|
| | No canister in fuel line, no detergent | One liter canister, no detergent | No canister, detergent present |
| 30 | a 11.5 | a 3.7 | b 1-3 | a Average of three runs.
b Range of test experience with commercially available gasoline containing detergent.

In the first run, standard gasoline was passed directly through an internal combustion engine carburetor. The expected build-up of deposits on the carburetor's surface was observed.

In the second run, gasoline was first passed through a bed of Resin N and thence to a standard IC carburetor.

In the third run, a gasoline as marketed was run through the IC engine carburetor, and the anticipated cleaner carburetor operation was observed.

It was observed that there were negligible deposits on the carburetor surfaces in both runs two and three. Thus the very effect accomplished by the detergent additives, was achieved by resin use alone. Concurrently, we are accomplishing the even more important major effect of scavenging the low concentration lead in the gasoline.

Several methods of employing the present invention are visualized. In one case a cartridge containing the lead removing resin may be placed in the gasoline line between the fuel pump and the carburetor of the automobile. Thus, lead is removed just prior to combustion of the fuel. In another case, the sulfonic acid or metal salt resins may be housed in a porous canister which is situated in the gasoline tank. Natural movement of the gasoline in the reservoir, in addition to normal diffusive effects, will circulate the gasoline through the resin, and result ultimately in the removal of the greatest quantity of lead from the gasoline. A small cartridge of an exemplary resin of this invention disposed in the fuel line, could serve as a scavenger for any small traces of lead which might remain in the gasoline, despite the concurrent use of a gas tank resin canister.

Other deployment of MR ion exchange resins for lead removal might be in separation columns or in association with the field storage tanks of a petroleum refinery; where residual lead compounds could be removed from hydrocarbon fuels as they are taken from storage prior to shipment via pipeline, tank car, or tank truck. Generally, the present invention will find wide utility in the processing, handling, and storing of lead-containing hydrocarbon fuels.

In another application, resin canisters could be placed in the pumping manifolds at local gasoline stations, such that last measurable traces of organolead may be removed from the fuel before storage in the gasoline tanks of individual motor vehicles.

All such deployments of the present resins either by themselves or in combination with one another, could assure the vehicle operator that only miniscule amounts of lead reach the vehicle catalytic muffler.

At the worst, such trace lead levels would slowly reduce the catalyst life and efficiency of hydrocarbon oxidation of the exhaust fumes. This, in turn, will help lessen the pollution of the atmosphere by minimizing emission of incompletely combusted hydrocarbons. Further, the emission of lead compounds will also be drastically reduced.

In another case, the canister of MR resin may be placed between the carburetor and the engine of the motor vehicle such that tetraalkyllead may be removed both in the liquid and vapor state from the fuel.

Referring now to the drawing, wherein like parts have been designated by like reference numerals, and in particular to the FIG. IV embodiment of a filtering canister which may be usefully employed as the practical means to reduce the organolead concentration in hydrocarbon fuels, the canister is generally designated 1. The reservoir 2 is preferably of a rigid, chemically inert construction material, such as low carbon steel, aluminum or zinc alloy; and of fairly close tolerances so as to provide for proper and leak-proof mating of the several components to be described. Reservoir 2 must be of sufficient wall thickness (minimum of 22 gauge) so as to withstand low internal pressures during this operation as a support for a contained adsorbent serving as a filtering material.

Further it is desirable that at least one end of the reservoir should be nearly spherical in shape so as to facilitate distribution of the influent liquid flow over the interior volume filled with adsorbent. The other end of the reservoir, which serves as the effluent end, may either be of a tapering construction (as shown) or rectangularly formed when viewed in cross-section.

An opening, 3, is provided in the influent end of the reservoir, usually by machining. This opening is adapted and sized to accommodate a hollow fitting, such as a pipe threaded nipple 4, that threadedly and sealingly engages the edges of opening 3. Disposed within opening 3 is a filter screen 5 (typically of 350 steel mesh) which forms an inwardly biased rigid "top hat" configuration. Screen 5 has solid plug 6 in the bottom thereof, either spot welded or crimped into place, so as to prevent direct influent stream impingement on the particulate material disposed within the receptacle. Screen 5 itself may be pressed into a counter bore within the fitting or staked in place. An additional advantage of screen 5 is that it serves to prevent loss of any particulate material during canister handling, or during operation, as may be caused by even low back pressure build-up.

The effluent opening 7, of reservoir 2, is provided with a second displaceable hollow plug 8, conventionally a pipe threaded nipple, which is fixedly engaged, as by spot welding, with the periphery of opening 7. Further provided in threading engagement with nipple 8 is a smaller hollow nipple 9, which has a second steel mesh screen 11, staked in place on the nipple side inwardly disposed of the canister 1. The purpose of screen 11 is similarly to prevent loss of highly particulate material from the receptacle 1 (canister) during handling and at operation.

This metal canister is sized so as to at least accommodate between 1 and 2 liters of a particulate material 10, which may be added after complete fabrication of the canister; or alternatively, just prior to the last seal weld, depending upon the fabrication method employed. The canister can be of a throwaway design or constructed so as to be reusable. A prime consideration is low cost consistent with a safe and leak-proof design.

In one approach to fabrication, a low carbon steel sheet can be formed in two or three sections. The machined first fitting, 4, is welded into place, and the inlet screen, 5, is inserted. The machined outlet fitting, 7, is also welded into place. After painting the receptacle, it is loaded with the particulated adsorbent material and the completed plug assembly (with internal screen 11 secured thereto) is screwed into sealing engagement by using spanner wrench holes 12, provided in the external surface of nipple 9.

Set forth below in tabular form are typical design parameters which should be relied upon, in fabrication of the aforedescribed representative canister for use with an internal combustion engine carburetor:

1. Design pressure—60 p.s.i.
2. Operating pressure—5–40 p.s.i.
3. Design temperature (maximum)—350° F.
4. Normal temperature range— —30° F. to 250° F.
5. Dimension:
   1 liter—2.54 in I.D., 12.0 in. straight side
   2 liter—3.60 in. I.D., 12.0 in. straight side
6. Material—low carbon steel, alminum or zinc alloy
7. Finish—Steel—prime and two coat exterior aluminum or die cast alloy—none.
8. Filter screen—350 mesh—steel.
9. Filter material—30 to 60 U.S. screen size, non-hazardous similar to a very fine sand, S.G.=0.5. Canister to be completely filled.

In operation, organic liquids containing measurable levels of organolead are pumped or flowed through this filtration assembly, entering via opening 3. After significant absorption of the lead component has been accomplished within the particulated resin, the organic liquid or hydrocarbon flows from the canister via outlet 9 to conventional carburetion.

We claim:
1. The method of significantly reducing the level of organo lead compounds contained in hydrocarbon liquids comprising: contacting the liquids containing the organolead compounds with a mass or bed of a particulate, strongly acidic functional macroreticular resin, in either the acid form with acid groups selected from sulfonic acid, sulfuric acid and phosphoric acid or metal salt form, said resin having a bead porosity of 10 to 75%; a surface area of 10 to 1000 square meters per gram; whereby significant amounts of said organo lead compounds are adsorbed on to the resin and thereby removed from the liquid.

2. A method of claim 24 in which the acid is one of sulfonic acid and phosphoric acid.

3. A method of claim 1 wherein the exhausted macroreticular ion exchange resin is regenerated with an acid selected from the class consisting of a mineral or organic acid to remove the lead from the resin sites.

4. The method of claim 1 wherein the resin is a strong acid derivative of a copolymer of 100 to 10 weight percent divinylbenzene, and 0 to 90 weight percent of ethylvinylbenzene and styrene.

5. The method of claim 1 wherein the said resin is a strong acid derivative of a copolymer composed of 100 to 10 weight percent of divinylbenezene, and from 0 to 90 weight percent of styrene and ethylvinylbenzene, both percentages being by weight, and has a specific surface area of 500 to 700 square meters per gram, a bead porosity of 40 to 50% by volume; and an average pore diameter of 40 to 50 Angstrom units.

6. The method of claim 1 wherein the resin is a copper salt of a strong acid derivative of a copolymer composed of 100 to 10 weight percent of divinylbenzene, and from 0 to 90 weight percent styrene and ethylvinylbenzene, both percentages being by weight; a bead porosity of 30 to 50%; a surface area of 250 to 700 square meters per gram; and an average pore diameter of 20 to 100 Angstrom units.

7. The method of claim 7 wherein the organo lead compounds are tetra alkyl lead.

8. The method of significantly reducing the level of organolead compounds contained in hydrocarbon fuels comprising:
   (a) imposing a fixed bed or mass of a particulate, strongly acidic functional macroreticular resin, in either the acid form with acid groups selected from sulfonic acid, sulfuric acid and phosphoric acid or metal salt form said resin having a bead porosity of 10 to 75%; and a surface area of 10 to 1000 sq. meters/gram; in a location selected from one of the following:
      A. a fuel storage reservoir;
      B. a fuel feed system
         or both A. and B. concurrently, but upstream of the combustion chamber of an internal combustion engine; and
   (b) contacting an engine fuel containing measurable quantities of organolead compounds with said resin, whereby significant amounts of said lead compounds are removed.

9. The method according to claim 8 wherein the resin comprises a sulfonic acid derivative of an essentially non-ionogenic, macroreticular, water-insoluble cross-linked polymer of polymerizable ethylenically unsaturated monomers comprising about 2 to 100 weight percent of at least one poly(vinyl benzene monomer selected from the group consisting of divinylbenzene, trivinylbenzene and alkyl divinylbenzenes having from 1 to 3 alkyl groups of 1 to 2 carbon atoms substituted in the benzene nucleus.

10. The method of claim 1 wherein said resin mass is disposed in a fuel reservoir supplying the internal combustion engine of a motor vehicle.

11. The method of claim 1 wherein said resin mass is positioned in a location selected from a reservoir or a fuel feed system, or both, leading therefrom.

12. The method of claim 7 wherein the alkyl groups of tetraalkyllead compounds are one of methyl, ethyl, and combinations thereof.

13. The method of claim 1 wherein said resin is composed of hard beads having a screen size from—16 to +100.

14. The method of claim 1 wherein the metal salt is copper.

15. The method of claim 1 wherein the metal salt is mercury.

16. The method of claim 1 wherein the metal salt is silver.

17. The method of claim 1 wherein the metal salt is aluminium.

18. The method of claim 1 wherein the metal salt is zinc.

19. A method for inhibiting the build up of carbon and varnish deposits on the surfaces of a carburetor and induction system associated with an internal combustion engine, said deposits being due to organolead compounds and precursors normally being found in standard gasolines as supplied to said engine, comprising: contacting the precursors-containing gasoline with a mass or bed of a particulate strongly acid functional macroreticular resin in either the acid form with acid groups selected from sulfonic acid, sulfuric acid and phosphoric acid or metal salt form, said resin having a bead porosity of 10 to 75 percent; and a surface area of 10 to 1000 square meters per gram; prior to passing said gasoline to the carburetor, whereby significant amounts of said organolead precursors are adsorbed on the resin.

20. The method of claim 1 wherein the metal salt is ferric.

21. The method of claim 1 in which the macroreticular resin is in the acid form.

22. Method of claim 1 in which the macroreticular resin is in the metal salt form.

23. The method of claim 8 in which the resin is in the acid form.

24. The method according to claim 8 in which the resin is in the metal salt form.

References Cited

UNITED STATES PATENTS

| | | | |
|---|---|---|---|
| 3,409,691 | 11/1968 | Small | 260—676 |
| 3,668,111 | 6/1972 | Dvoracek et al. | 208—48 AA |
| 2,969,320 | 1/1961 | Shapiro et al. | 208—251 R |
| 2,609,931 | 9/1952 | Rodman | 210—62 |
| 3,105,038 | 9/1963 | Ayers | 208—251 R |
| 3,105,638 | 9/1963 | Ayers | 208—251 |
| 2,341,329 | 2/1944 | Myers | 208—251 |
| 2,944,965 | 7/1960 | Mirabile | 208—251 |
| 2,368,261 | 11/1945 | Neef | 208—252 |
| 2,392,846 | 1/1946 | Friedman | 208—253 |
| 3,197,416 | 7/1965 | Bergman et al. | 252—411 |

DELEBERT E. GANTZ, Primary Examiner

J. M. NELSON, Assistant Examiner

U.S. Cl. X.R.

208—253, 299